July 26, 1949.  H. GRAYSON  2,476,975
BEAT FREQUENCY OSCILLATOR

Filed Nov. 28, 1947  3 Sheets-Sheet 1

INVENTOR
HARRY GRAYSON
BY RP Morris
ATTORNEY

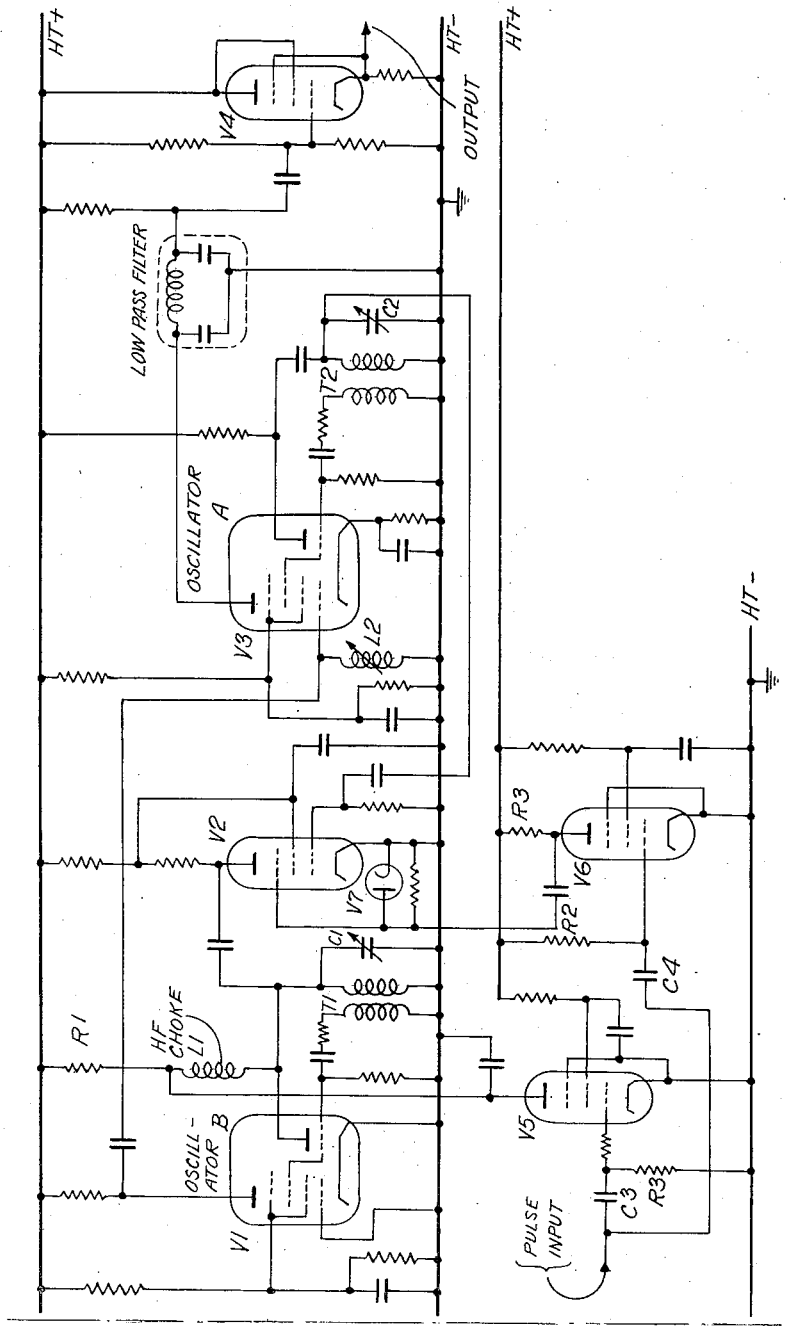

Patented July 26, 1949

2,476,975

UNITED STATES PATENT OFFICE 2,476,975

BEAT FREQUENCY OSCILLATOR

Harry Grayson, London, England, assignor to International Standard Electric Corporation, New York, N. Y., a corporation of Delaware Application November 28, 1947, Serial No. 788,410
In Great Britain November 30, 1946

5 Claims. (Cl. 250—36)

1

This invention relates to the synchronisation of alternating electric currents of substantially sinusoidal wave form so that they are "rephased" periodically by a recurrent impulse.

In certain types of electrical equipment it is desired to have an electrical waveform of approximately sinusoidal shape, the phase of which is locked or controlled by an independent impulse or series of impulses. In some cases the waveform ultimately required is not sinusoidal but is one which could conveniently be derived from a sinusoidal waveform; for example, a series of periodic pulses may be required commencing in synchronism with an impulse from a separate source.

The need for such waveforms is illustrated by the following examples.

(a) In measurements of the frequency response and phase characteristics of electrical networks and amplifiers it is convenient to feed into the network or amplifier a sinusoidal waveform of continuously variable frequency which is locked in phase with the time-base of an oscilloscope by means of which the said characteristics are examined. In certain types of measurement of this kind it is often preferable to synchronise the time-base from a separate trigger circuit rather than from the sine-wave source fed into the apparatus under examination, hence it becomes necessary to rephase the said sine-wave at the commencement of each time-base stroke.

(b) In television systems it is useful to be able to measure the frequency response of the equipment by applying a signal of continuously variable frequency to the vision signal input and viewing the output on the television picture screen or on a cathode-ray tube monitor, the time-bases of which are locked to the television-synchronising pulses. In order to obtain a stationary pattern on the screen independently of the input frequency it is necessary that the input waveform be locked in phase with the synchronising pulses.

(c) In radar systems it is necessary to calibrate the time-bases employed, in order that the range of the target may be determined. This calibration is usually performed by observing a series of marker pulses, the time-spacing of which is related to the units of range employed. It is necessary that this series of pulses should commence in synchronism with the pulse radiated by the radar transmitter.

(d) For educational demonstrations and in certain types of research work, it is useful to be able to examine by an oscilloscope, the effects pro-

2 duced by combining two or more periodic waves. For example, it may be desired to examine the behaviour of various types of mixer circuits or other electrical networks, or the formation of "beats" by the mixing of periodic waves, or the synthesis of modulated waves by the combination of carriers and sidebands. For the precise examination of the phenomena concerned, it is useful to be able to ensure a definite phase relationship between the input waves and the time-base of the oscilloscope.

Where a cathode ray tube oscilloscope or similar device is used for the examination of the periodic waveforms, it is desirable that the waveforms produced on each trace should be superimposed on the screen, so that an apparently stationary pattern is produced. If a continuous periodic waveform is being examined, this effect is only possible if the frequency of the periodic waveform is an exact multiple of the time-base triggering frequency. This is often not convenient, or is impossible; hence it is necessary to re-start or "re-phase" the periodic waveform at the commencement (or a time previous to the commencement) of each time-base trace.

According to one of its aspects the invention consists of a device for periodically synchronising an alternating electric current having a means for generating an alternating electric current, a second means for generating a second alternating electric current of different frequency from that generated by the first means, a means for mixing the said two alternating electric currents the output of which is normally an alternating electric current of a frequency equal to either the sum or the difference of the frequencies of the currents generated by the two first mentioned means, a means for periodically connecting the output of one of the two generating means to the other so that one of said generating means coerces the other into oscillation at the same frequency and in phase with the current generated by the coercing generating means and a means for periodically removing the said connection between the said generating means after a constant period of interconnection so that the coerced generating means reverts to its normal mode of oscillation at the instant of removal of the interconnection having at that instant and at every recurrence of that instant, a constant phase relationship to the other or coercing generating means and so that the output of the said mixing means is in the same phase at all recurrences of the said instant of removal.

According to another of its aspects the invention consists of a device for synchronising an alternating electric current of substantially sinusoidal form by an externally applied recurring impulse in which there are two sources of alternating currents of different frequency feeding a mixing circuit the normal output of which is an alternating current of a frequency equal to either the sum or the difference of the two first mentioned frequencies and in which, during the said applied impulse or some part thereof one of the said sources of alternating current is coerced into oscillating at the frequency of and in phase with the other so that on or before the cessation of the said externally applied impulse the coerced source of alternating current reverts to its normal frequency of oscillation bearing at the instant of reversion a constant phase relationship with respect to the other or coercing source of alternating current on successive recurrences of the said externally applied impulse, arranged so that the phase of the alternating current emerging from the said mixing circuit at the said instant of reversion is the same on every recurrence of the said instant resulting from recurrences of the said externally applied impulse.

According to another of its aspects the invention consists of a device for periodically synchronising an alternating electric current having a means for generating an alternating electric current, a second means for generating a second alternating electric current of different frequency from that generated by the first means, a means for mixing the said two alternating electric currents the output of which is normally an alternating electric current of a frequency equal to either the sum or the difference of the frequencies of the currents generated by the two first mentioned means, a means for periodically attenuating damping or otherwise reducing the output of one of the said generating means and a means for constantly feeding into the generating means so attenuated damped or reduced in output a portion of the output of the other generating means, of such intensity that it is able to coerce the attenuated, damped or reduced generating means into synchrony with the other generating means at an instant whilst it is recovering its natural mode of oscillation after removal of the attenuation damping or reduction but not of such intensity as to cause the two generating means to interact at other times, so that the output of the said mixing means is in the same phase at all recurrences of the said instant.

Two oscillators are provided (one or both being variable in frequency), the outputs of which are fed into a mixer from which the required output is taken in the form of oscillation being the sum or difference in the frequencies of the two oscillators, and a filter may be provided to remove unwanted frequencies.

The two oscillators are interconnected by a gate circuit which is arranged so that, in one condition thereof, which may be considered as the "open" condition of the gate, one of the oscillators pulls or coerces the other into synchrony with it, in phase and frequency.

The gate circuit is arranged so that it may be put into the open condition by an externally applied impulse.

When the two oscillators are in synchrony, the output of the mixer circuit is substantially devoid of an alternating current component and at the instant when the interconnection between them is removed the coerced oscillator returns to its normal mode of oscillation. At this instant, the alternating current output of the mixer recommences and if the process is repeated, the output will always recommence in the same phase, since the phase of the mixer output at any instant of time depends upon the relative phase of the outputs of the two oscillators and is substantially independent of the absolute phase of either oscillator output.

It may be advantageous to attenuate the output of the oscillator to be coerced for a period terminating during the time that the two oscillators are interconnected, to make it more readily coercible.

An embodiment of the invention will now be described in relation to the attached drawings in which Fig. 1 is a block schematic diagram showing the basic circuit elements of the embodiment.

Fig. 3 shows a detailed circuit diagram of the embodiment.

Figure 1:
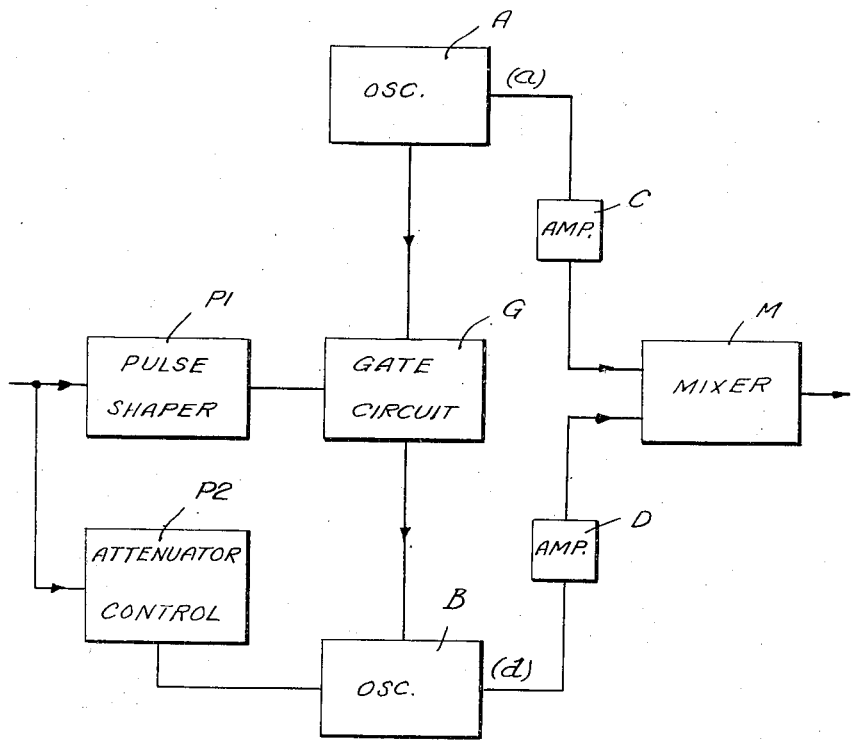

In Fig. 1 an oscillator A and an oscillator B have their outputs at $(a)$ and $(d)$ fed into a mixer M via buffer amplifiers C and D respectively.

G is a gate circuit through which the output of oscillator A is fed to oscillator B at times when the gate circuit is in the open condition.

Gate circuit G is put into the open condition on application of a pulse supplied from or through $P_1$ which may be a pulse producing circuit or a pulse shaper circuit fed from an external source.

$P_2$ shown in dotted lines, is a circuit producing or shaping pulses to attenuate the oscillations of oscillator B and may be fed from $P_1$ or from an external source which may be the same as that feeding $P_1$ when $P_1$ is fed from an external source.

Figure 2:
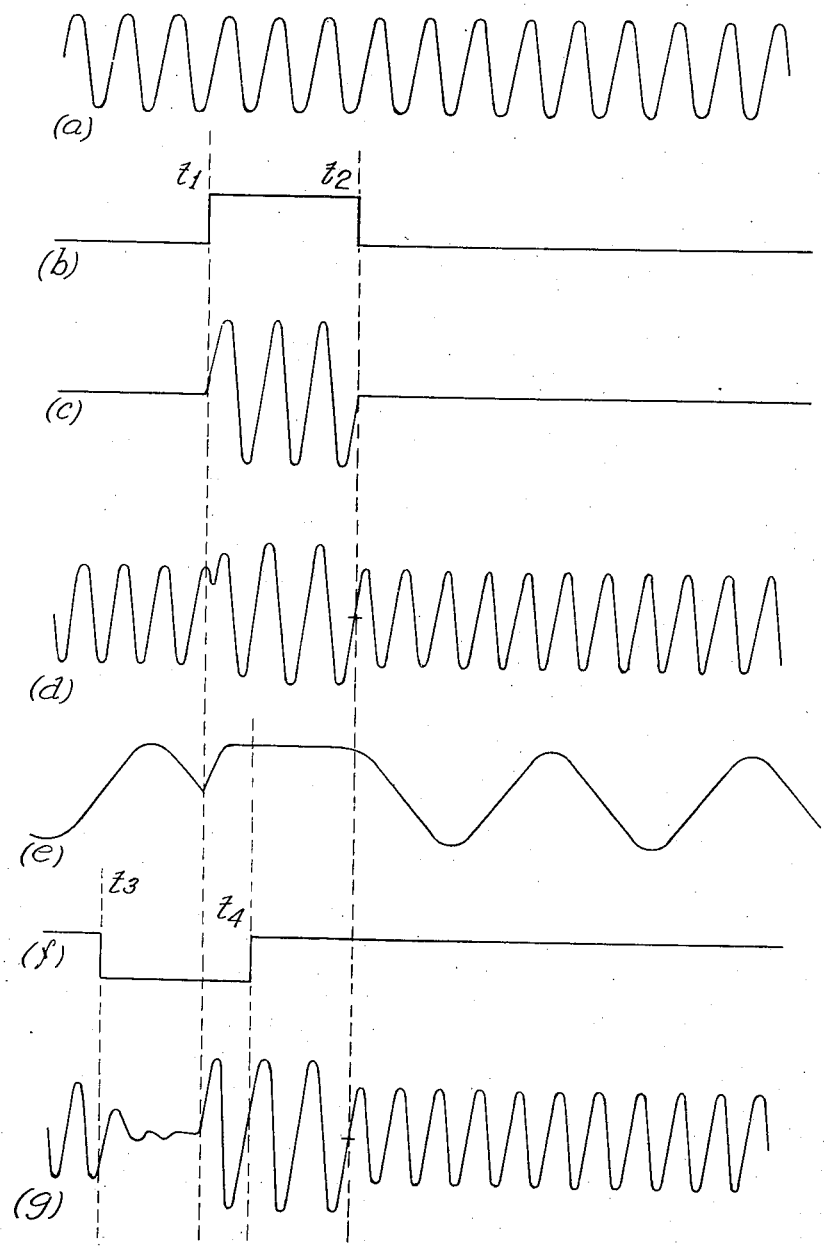
Fig. 2 shows a series of graphs of the wave forms at various points of the apparatus illustrated in Fig. 1, the small bracketed letters at the left hand side of the graphs indicating the waveforms at points indicated by similar letters in Fig. 1. The horizontal axis of these graphs represents time and the vertical axis voltage.

In Figure 2, graph $(a)$ shows the wave form of the output of oscillator A, graph $(b)$ shows the wave form of the pulse fed to gate circuit G, and graph C shows the output from gate circuit G fed to oscillator B.

From these graphs it will be seen that in this embodiment the pulse from $P_1$ is a positive pulse commencing at time $t_1$ and continuing till time $t_2$ during which time the oscillations of oscillator A are applied to oscillator B. Other forms of pulse may be used in different forms of the invention according to the type of gate circuit used.

Graph $(d)$ shows the effect on the output of oscillator B, of the applied oscillations from oscillator A. At or soon after time $t_1$ oscillator B is coerced into synchrony in phase and frequency with oscillator A and at time $t_2$ reverts to its own natural mode of oscillation.

Graph $(e)$ shows the output of mixer M and it will be seen that the synchronisation of oscillator A and oscillator B, at or soon after time $t_1$ removes the alternating current component of the output, to zero, until time $t_2$, when the oscillations from mixer recommence. This graph represents a simplified or idealised condition in which the oscillations from A and B during the time $t_1$ to $t_2$ are assumed to arrive at mixer M exactly in phase. In practice, there may well be some phase displacement of one or other of the inputs to mixer M, occurring in the buffer amplifiers C or D or the mixer M may itself introduce some such phase displacement. If the two inputs to M were exactly in phase, the output of M between $t_1$ and $t_2$ would be substantially direct current of a value equal to the peak value of the alternating current forming its normal output. In the type of mixer used in this embodiment any phase displacement of the two inputs would reduce the value of this direct current output. As, however, the relative phases of the two inputs will always be constant during pulses from $P_1$ this does not affect the operation of the device since it does not matter what phase the alternating current output of mixer M adopts when it recommences at $t_2$ provided that it is always in the same phase on all repetitions of $t_2$.

There will also in practice be a certain residual alternating component in the output of M between $t_1$ and $t_2$ and when this results from failure completely to coerce oscillator B into synchrony with oscillator A, this remaining alternating component will cause a proportionate inaccuracy in the operation of the device.

There will also be a tendency for the transients occurring in the circuits at time $t_1$ to set up oscillations in various parts of the circuit which will usually be subject to exponential decay but which may well extend beyond $t_2$. As, however, these oscillations will always have the same starting time $t_1$ and will arise from the same accidental circuit characteristics, they will usually be constant in phase at time $t_2$ and will thus not affect the operation of the device.

There may in practice be other alternating components in the output of the mixer M between $t_1$ and $t_2$ some of which will be of random phase in relation to the pulses from $P_1$ and some of which will be synchronous with such pulses. The former will and the latter will not affect the accuracy of operation of the device.

Graph (f) shows the wave form of a pulse applied to oscillator B from $P_2$, for the purpose of cutting off such oscillator so that it may be more readily coerced into synchrony with oscillator A and graph (g) shows the effect of this on the output of oscillator B. It is not necessary that time $t_3$ should precede time $t_1$ but times $t_3$ and $t_4$ must precede time $t_2$. It has been found that the addition of this feature to the invention enables oscillator B to be coerced by a very much weaker signal from oscillator A but in some forms of the invention it may be more profitable to raise the level of the coercing oscillations from oscillator A and to omit this feature.

Fig. 3 shows the circuit of the embodiment being described.

In this circuit, the oscillators A and B of Figure 1 are formed by the triode sections of the triode-hexode valves $V_3$ and $V_1$ respectively. These oscillators use a parallel-fed tuned anode circuit with inductive coupling to the grid. The hexode section of $V_1$ forms a buffer amplifier for oscillator B, and the anode circuit of this hexode is fed to the signal grid of the hexode section of $V_3$.

The third grid of the hexode section of $V_3$ is joined internally to the triode section, and this hexode forms the mixer M. The beat-frequency oscillation from the anode of this hexode is fed through the low-pass filter to the grid of the cathode follower $V_4$, and the output of the instrument is taken from the cathode of $V_4$. This low pass filter and cathode follower may be considered as forming part of mixer M of Fig. 1.

This embodiment is adapted to provide a normal output from the mixer M of a frequency equal to the difference between the frequencies of oscillators A and B and this frequency is capable of variation by altering the frequency of oscillator A. The low pass filter has a cut-off frequency somewhat above the highest output frequency which the device is designed to deliver.

The variable condenser $C_2$, tuning oscillator A, is provided with a calibrated scale from which the beat-frequency may be read directly. The variable condenser $C_1$ on oscillator B is provided to form a small frequency adjustment on this oscillator to compensate for any unwanted frequency drifts in the oscillators.

Periodic positive trigger pulses are applied to point "P." These positive pulses are the externally applied pulses described above and are the pulses by which the output of the device is periodically "re-phased." They are applied via condenser $C_3$ to the pentode $V_5$. In this embodiment the one externally applied pulse is used to operate $P_2$ on Fig. 1 which is represented by $V_5$ and the output of $V_5$ is fed to $V_6$ which represents $P_1$ on Fig. 1. It will thus be seen that the circuit of Fig. 3 follows the dotted line form of the device illustrated in Fig. 1.

The D. C. potential developed across the $R_3$, due to grid current, will hold $V_5$ cut off during the interval between the pulses.

The pentode $V_5$ will thus conduct only for the duration of the pulse. During this conduction period the valve will pass anode current; this produces a voltage drop in resistor $R_1$, thus bringing the anode potentials of $V_5$ and the triode section of $V_1$ nearly to earth potential. The oscillation of B will deteriorate during this period.

The input pulse is also applied via condenser $C_4$ to the grid of pentode $V_6$. This valve is normally conducting, and passing grid current via resistance $R_2$. The negative-going trailing edge of the input pulse causes $V_6$ to cut off; condenser $C_4$ then commences charging via resistances $R_2$, the potential of the grid of $V_6$ thereby returning towards its original value at a rate determined by the time constant of $R_2$ and $C_4$. The valve $V_6$ thus remains cut off for a time determined by the values of $R_2$ and $C_4$.

The anode potential of $V_6$ will rise during the time that this valve is cut off, and a positive pulse is therefore formed across the anode resistor $R_3$. This positive pulse, which occurs almost immediately after the input pulse, is applied to the suppressor grid of the gate valve $V_2$, which corresponds to the gate circuit G in Fig. 1. $V_2$ is normally cut off by its suppressor grid. The diode $V_7$ assists in the self biassing of the suppressor grid of $V_2$ and prevents it from rising positive.

The anode of $V_2$ conducts during this positive pulse applied to the suppressor, and the valve thereby forms an amplifier during this period, injecting an output from oscillator A into the tuned circuit of oscillator B.

This injection takes place at a time when the anode of oscillator B is recovering its normal potential, and recommencing oscillation. This new oscillation is forced into phase with that of oscillator A.

When $V_6$ again conducts the valve $V_2$ reverts to the non-conducting state and the gate circuit is closed.

Oscillator B then reverts to its normal mode of oscillation and the output of the device reverts to normal but in corrected phase.

In a modified form of the invention the gate circuit is omitted, and its place taken by a coupling circuit, not connected to any external pulse source, which feeds a very small proportion of the output of oscillator A into oscillator B, constantly. This circuit is adjusted, so that the two oscillators do not normally interact but when the oscillator B is damped or attenuated during the pulse from $P_2$ it is momentarily forced into phase with oscillator A when it is recovering and its output is as yet insufficient to resist the coercion of oscillator A, received from the said coupling circuit. It is found that this simplified arrangement gives adequate rephasing of the output of mixer M in some applications of the invention.

What is claimed is:

1. A device for periodically synchronising an alternating electric current having a means for generating an alternating electric current, a second means for generating a second alternating electric current of different frequency from that generated by the first means, a means for mixing the said two alternating electric currents the output of which is normally an alternating electric current of a frequency equal to either the sum or the difference of the frequencies of the currents generated by the two first mentioned means, a means for periodically connecting the output of one of the two generating means to the other so that one of said generating means coerces the other into oscillation at the same frequency and in phase with the current generated by the coercing generating means and a means for periodically removing the said connection between the said generating means after a constant period of interconnection so that the coerced generating means reverts to its normal mode of oscillation at the instant of removal of the interconnection having at that instant and at every recurrence of that instant, a constant phase relationship to the other or coercing generating means and so that the output of the said mixing means is in the same phase at all recurrences of the said instant of removal.

2. A device for synchronising an alternating electric current of substantially sinusoidal form by an externally applied recurring impulse from a given generator, comprising two sources of alternating currents of different frequency, a mixing circuit, means for feeding said currents of different frequency to said mixing circuit the normal output of which is an alternating current of a frequency equal to either the sum or the difference of the two first mentioned frequencies, means under control of said impulse for coercing one of the said sources of alternating current into oscillation at the frequency of and in phase with the other means for reverting on or before the cessation of the said impulse the coerced source of alternating current to its normal frequency of oscillation bearing whereby at the instant of reversion a constant phase relationship with respect to the other or coercing source of alternating current on successive recurrences of the said impulse is obtained and whereby the phase of the alternating current emerging from the said mixing circuit at the said instant of reversion is the same on every recurrence of the said instant resulting from recurrences of the said externally applied impulse.

3. A device as claimed in claim 1 incorporating means reducing the output of the generating means to be coerced for a time terminating before the instant of removal of the said interconnection between the two said generating means, so that the one may more readily coerce the other.

4. A device according to claim 1 comprising a pulse source, means responsive to a pulse from said source to interconnect the said two generating means of sources of alternating current during the continuance of such pulse so that the one is coerced into synchrony in phase and frequency with the other a second source of a pulse related in time to the first mentioned pulse to reduce the output of the coerced generating means or source of oscillations during the continuance of the secondly mentioned pulse, and common means for synchronizing the pulses from said two sources.

5. A device for periodically synchronising an alternating electric current having a means for generating an alternating electric current, a second means for generating a second alternating electric current of different frequency from that generated by the first means, a means for mixing the said two alternating electric currents the output of which is normally an alternating electric current of a frequency equal to either the sum or the difference of the frequencies of the currents generated by the two first mentioned means, a means for periodically reducing the output of one of the said generating means and a means for constantly feeding into the generating means so reduced in output a portion of the output of the other generating means, of such intensity that it is able to coerce the reduced generating means into synchrony with the other generating means at an instant whilst it is recovering its natural mode of oscillation after removal of the reduction but not of such intensity as to cause the two generating means to interact at other times, so that the output of the said mixing means is in the same phase at all recurrences of the said instant.

HARRY GRAYSON.

No references cited.